Figure 1:
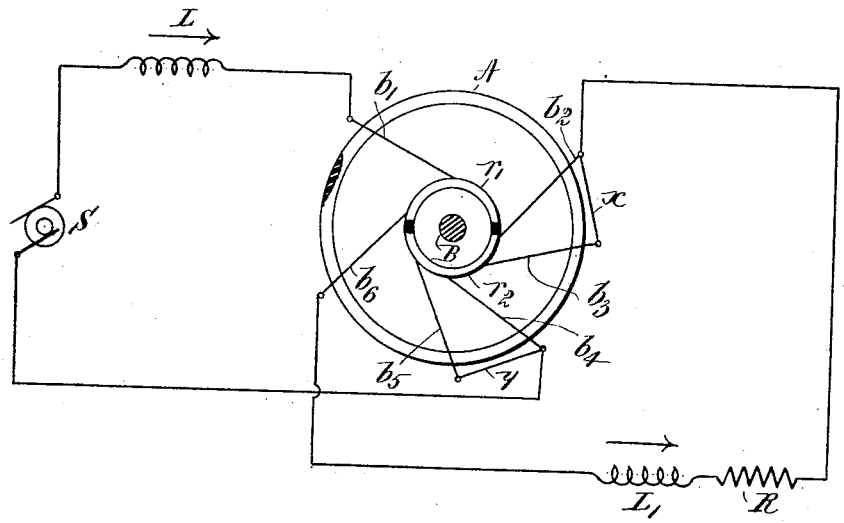

S. CABOT.
ELECTRIC CONVERSION.
APPLICATION FILED AUG. 22, 1912.

1,112,436.

Patented Oct. 6, 1914.

UNITED STATES PATENT OFFICE.

SEWALL CABOT, OF BROOKLINE, MASSACHUSETTS.

ELECTRIC CONVERSION.

1,112,436.   Specification of Letters Patent.   Patented Oct. 6, 1914.

Application filed August 22, 1912. Serial No. 716,360.

*To all whom it may concern:*

Be it known that I, SEWALL CABOT, citizen of the United States, and resident of Brookline, in the county of Norfolk and State of Massachusetts, have invented a new and useful Improvement in Electric Conversion, of which the following is a specification.

My invention relates to the conversion of alternating current to direct current by synchronous commutation.

The object of my invention is to provide a system for commutating alternating current supplied on a substantially constant-potential basis so as to obtain a practically steady direct current on a substantially constant-current basis when the counter E. M. F. of the working circuit is not greater than about 50% of the A. C. source.

A further object of my invention is to minimize the sparking on the commutator, such sparking having a tendency to occur when the counter E. M. F. of the working circuit changes and to persist until the angle of commutation is shifted.

In the drawings which accompany and form a part of this specification, I have illustrated one form of apparatus and an arrangement of circuits whereby the foregoing objects may be realized.

Figure 2:
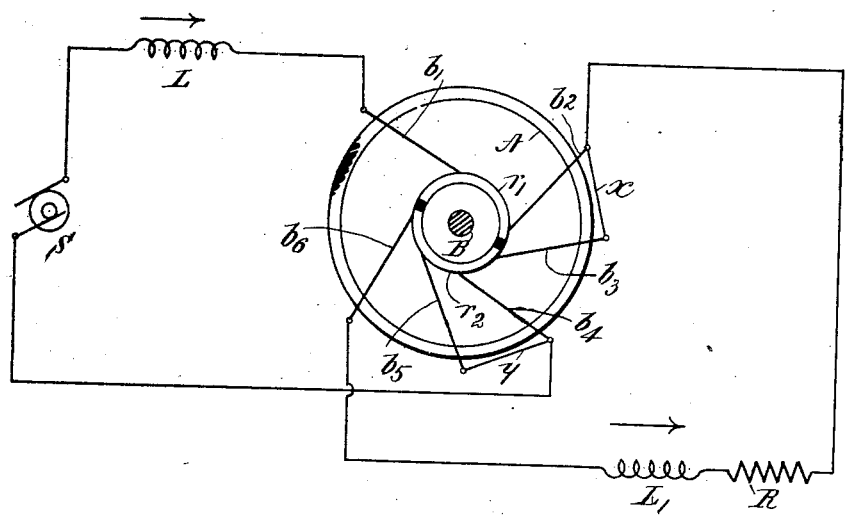

In the drawings: Figure 1 is a diagram showing the commutator in such position that current will flow from the source to the working circuit; and Fig. 2 is a similar diagram showing the commutator in position to short-circuit the connections of the source to the working circuit.

In the figures, S represents a source of preferably constant-potential alternating current.

L is an inductance, the function of which is to govern the value of current in the working or direct-current circuits.

$r_1$ and $r_2$ are two commutating segments suitably secured to and rotating with the shaft B of a 4-pole synchronous motor energized by the source S or else secured to and rotating with the shaft of a 4-pole A. C. generator. Brushes $b_1 \ldots b_6$ are suitably secured to the frame A which is adjustable about the shaft B and thus constitutes the equivalent of a rocker arm. These brushes make electrical contact with the commutator segments and their function is to reverse synchronously the connections of the A. C. source to the D. C. working circuit and also to short-circuit said connections for the requisite interval of time to obtain sparkless commutation.

$L_1$ is an inductance in the D. C. or working circuit and its function is to reduce the fluctuations in the value of the current in the working circuit, and also to minimize changes in the angular position of the brushes required for sparkless commutation.

In designing the foregoing system, I prefer to make the value of L in henries approximately equal to the maximum E. M. F. of the source divided by twelve times the product of the amperes in the working circuit by frequency of the source in cycles per second. I also prefer to make the duration of the short-circuit equal approximately to the duration of a quarter of a cycle of the alternating current developed by said source and to make the value of $L_1$ in henries large as compared with the value of L. I have found that if the inductance $L_1$ is made adjustable, sparkless commutation may be obtained through wide ranges of load, and hence of counter E. M. F., in the working circuit without any shifting of the angle of commutation.

The operation is as follows: When the commutator is in the position shown in Fig. 1, alternating current flows from the source S in the direction indicated by the arrows in Fig. 1 through the inductance L to brush $b_1$, segment $r_1$, brush $b_6$, the inductance $L_1$, the resistance R, brushes $b_2$ and $b_3$, segment $r_2$ and thence back to the source by way of the brushes $b_4$ and $b_5$ and the cross-conductor $y$. As will be obvious, the arrangement of brushes and commutator segments is such that the connections of the source to the working current are short-circuited twice during every cycle and current is supplied to the working circuit from the source twice every cycle, and also that the duration of the time that said connections are short-circuited is substantially equal to the time during which current is supplied from the source to the working circuit. When the commutator is in such position that said connections are short-circuited, for example, when it has the position shown in Fig. 2, current will flow from the source S through the inductance L to the brush $b_1$, segment $r_1$, brush $b_2$, thence by way of the cross conductor $x$ to brush $b_3$, segment $r_2$ and thence back to the source by way of the brushes $b_4$, $b_5$. The E. M. F. of self induction in the working circuit due to the energy stored in the inductance $L_1$ will cause a current to flow in the direction indicated by the arrow over said coil, as follows: through the resistance R to conductor $x$, brush $b_3$, segment $r_2$, and thence back to the inductance $L_1$ by way of brush $b_6$. Current in the supply circuit will have the following path: from source S, inductance L, brush $b_1$, segment $r_1$, brush $b_2$, conductor $x$, brush $b_3$, segment $r_2$, and thence back to the source by way of the brushes $b_4$ $b_5$ and the cross-conductor $y$. During this period of short-circuit the alternating E. M. F. of the source reverses the direction of current flow in the inductance L, said current being equal in value to the current in the working circuit at the instant of removal of the short-circuit. Under these conditions, sparkless commutation will result, and these conditions may be produced by adjustment of the rocker arm. It will be readily understood that if the source S is a substantially constant-potential alternating current source, direct current will be developed in the working circuit on a substantially constant-current basis.

It will be understood that various modifications may be made, both in the apparatus and circuit connections herein shown and described, without departing from the principle of my invention.

I claim:—

1. A system for converting constant-potential A. C. to substantially constant-current D. C. comprising, in combination, a source of constant-potential A. C., a working circuit, an inductance in series with the source of A. C. for controlling the value of current in said working circuit, a synchronously driven commutator for controlling the connection of said source to said working circuit, and an inductance in series with said working circuit of value large compared to that of the first-mentioned inductance.

2. A system for converting constant-potential A. C. to substantially constant-current D. C. comprising, in combination, a source of constant-potential A. C., a working circuit, an inductance in series with said source of A. C. for controlling the value of current in said working circuit, a synchronously driven commutator, brushes connecting said commutator with said source and with said working circuit, said brushes being spaced around said commutator to connect said source to said working circuit twice during every cycle, means for short-circuiting the connections of said source to said working circuit twice during every cycle, and an inductance in series to said working circuit of value large compared with the first-mentioned inductance.

3. A system for converting constant-potential A. C. to substantially constant-current D. C. comprising, in combination, a source of constant-potential A. C., a working circuit, an inductance in series with the source of A. C., a synchronously-driven commutator for controlling the connection of said source to said working circuit, and an inductance in series with said working circuit, the value of the first mentioned inductance in henries being approximately equal to the maximum E. M. F. of said source divided by twelve times the product of the amperes in the working circuit by the frequency of the current of the source in cycles per second.

4. A system for converting constant-potential A. C. to substantially constant-current D. C. comprising, in combination, a source of constant-potential A. C., a working circuit, an inductance in series with the source of A. C., a synchronously driven commutator for controlling the connection of said source to said working circuit, and an inductance in series with said working circuit, the value of the first mentioned inductance in henries being approximately equal to the maximum E. M. F. of said source divided by twelve times the product of the amperes in the working circuit by the frequency of the current of the source in cycles per second and the value of the last mentioned inductance being large compared to that of the first mentioned inductance.

5. A system for converting constant-potential A. C. to substantially constant-current D. C. comprising, in combination, a source of constant-potential A. C., a working circuit, an inductance in series with said source of A. C. for controlling the value of current in said working circuit, a synchronously driven commutator, brushes connecting said commutator with said source and with said working circuit, said brushes being spaced around said commutator to connect said source to said working circuit twice during every cycle, means for short-circuiting the connections of said source to said working circuit twice during every cycle, the duration of such short-circuit being approximately equal to the duration of a quarter of a cycle of the alternating current developed by the source, and an inductance in series with said working circuit of value large compared to the first mentioned inductance.

In testimony whereof, I have hereunto subscribed my name this 16 day of Aug. 1912.

SEWALL CABOT.

Witnesses:
PATRICK J. CONROY,
GEO. K. WOODWORTH.